S. S. AMDURSKY.
CONTROLLING MECHANISM FOR ELECTRIC MOTOR VEHICLES.
APPLICATION FILED DEC. 17, 1914.
1,169,450.
Patented Jan. 25, 1916.
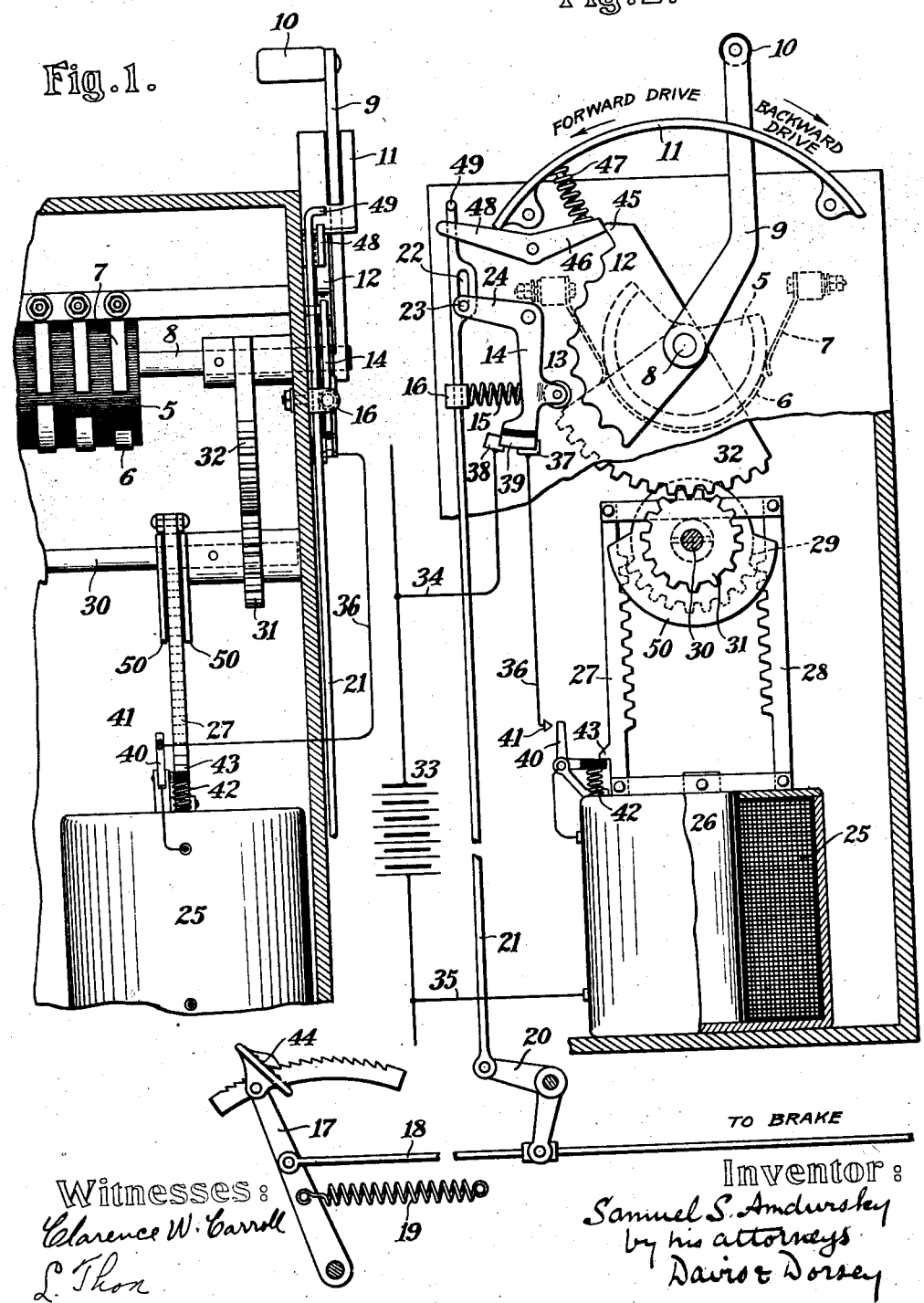
Witnesses:
Clarence W. Carroll
L. Thon
Inventor:
Samuel S. Amdursky
by his attorneys
Davis & Dorsey

UNITED STATES PATENT OFFICE.

SAMUEL S. AMDURSKY, OF ROCHESTER, NEW YORK.

CONTROLLING MECHANISM FOR ELECTRIC-MOTOR VEHICLES.

1,169,450. Specification of Letters Patent. Patented Jan. 25, 1916.

Application filed December 17, 1914. Serial No. 877,687.

*To all whom it may concern:*

Be it known that I, SAMUEL S. AMDURSKY, a citizen of the United States, and resident of Rochester, in the county of Monroe and State of New York, have invented certain new and useful Improvements in Controlling Mechanism for Electric-Motor Vehicles, of which the following is a specification.

This invention relates to the controlling-mechanism employed in connection with electrically driven vehicles.

The object of the invention is to provide against the waste of electric current, or the danger of injury to the electric motor of a vehicle, which occurs when the controller in such a vehicle is left in a position to energize the motor, at the same time that the brake is applied to the vehicle. When an electric vehicle is brought to rest by the application of the brake, the controller should obviously be returned to neutral or "off" position from any position in which it may have been set for forward driving, since any flow of current through the motor at such a time would be wasted, and would subject the motor to danger of overheating, as well as interfering with the action of the brake. On the other hand, when the vehicle has been brought to rest and the brake is still applied, the controller should not be moved from neutral position to driving position, since in such a case the same wasteful and dangerous conditions will arise. To insure a proper operation of the controller at such times, notwithstanding any carelessness on the part of the operator of the vehicle, I propose to employ, in connection with an electric controller of any ordinary or suitable form, means operating automatically, when the brake is applied, to return the controller to neutral position; and I further propose to employ means operating automatically, so long as the brake is applied, to prevent the controller from being moved from neutral position to a forward-driving position.

In the accompanying drawings:—Figures 1 and 2 are, respectively, a front-elevation and a side-elevation, partly in vertical section, of controlling-mechanism embodying the present invention.

The invention is illustrated as embodied in mechanism comprising an electric controller of ordinary form, provided with the usual drum 5 carrying movable contact-devices 6, which coöperate with fixed contact-springs 7, these parts being employed in the usual manner to control the connections between the storage-battery and the motor of the vehicle. The drum 5 is mounted on a shaft 8, journaled in the casing of the controller, and provided with a lever 9 by which the drum may be manually operated, the lever being provided, at its upper end, with a handle 10, and being guided in a slotted segmental plate 11.

The controller is shown as provided with a retaining-device, of ordinary form, for retaining the drum 5 in any operative position in which it may be left by the user. For this purpose a segmental plate 12 is fixed to the shaft 8, and the notched edge of this plate is engaged by a roller 13, carried by a lever 14 pivoted on the casing of the controller. A spring 15, seated upon a bearing-lug 16 on the casing, engages the lever 14 and tends to hold the roller 13 in yielding engagement with one or another of the notches in the plate 12, but yields readily to movement of the plate by the lever 9.

The brake-mechanism is shown as comprising an arm 17 connected with the brake (not shown) by a rod 18, and normally held in retracted or inoperative position by a spring 19. The arm 17 is provided with a combined pedal and retaining-device 44 of well known form.

The connections between the brake-mechanism and the controller comprise a bell-crank lever 20, of which one arm is pivoted to the rod 18, while the other arm is pivoted to a rod 21 which slides through an opening in the bearing-block 16. In order that the controller may be released when the brake is applied, preparatory to its automatic return to neutral position, the rod 21 is provided with a slot 22, coöperating with a pin 23 carried by an arm 24 on the lever 14. When the brake is applied, as shown in Fig. 2, the lever 20 is rocked and the rod 21 raised, thus causing the pin 23 to be engaged and raised, whereby the lever 14 is swung to the left, as shown, and the roller 13 is disengaged from the notched plate 12, thereby releasing the mechanism by which the drum 5 is actuated.

The return-movement of the controller to neutral position may be produced by means of various kinds, but for this purpose I preferably employ electromagnetic mechanism. As shown in the drawings, a solenoid-magnet 25 is mounted within the case of the controller, and provided with a movable core or armature 26. Two racks 27 and 28 are fixed to the core 26, so as to coöperate with a mutilated gear 29, which is fixed upon a countershaft 30 journaled horizontally beneath the controller-shaft 8. The racks are guided in their vertical movements by flanges 50 on opposite sides of the gear 29. A pinion 31, also fixed on the shaft 30, meshes with a segmental gear 32 fixed on the controller-shaft 8.

When the controller-lever 9 is moved in either direction from the neutral position shown in the drawings, the gears 32 and 31 act to rotate the countershaft in one direction or the other, thus causing the teeth of the gear 29 to engage one or the other of the racks 27, 28 and raise the racks and the core 26. After the parts have been moved in this manner, if the solenoid be energized it acts to pull the core and the racks downwardly again, thus rocking the gears 29, 31 and 32 back to normal position and returning the controller-drum to its neutral or off position.

In order that current may be employed, for the foregoing purpose, only when necessary, the energizing circuit of the solenoid 25 is controlled in accordance with the movements of the brake-mechanism. The solenoid is shown as connected, through wires 34, 35 and 36, with the main leads or conductors connected with an electric battery 33, which may be the storage-battery which supplies the current by which the vehicle is driven. The wires 34 and 36 are connected with fixed contact-devices 37 and 38, which coöperate with a movable contact-member 39 mounted upon the lever 14. When the brake is not in use, and the lever 14 and roller 13 are performing their normal function of a detent-device for the controller, the contact-member 39 is out of engagement with the contact 38, and the solenoid-circuit is open. When the brake is applied, however, the contact-member 39 connects the contacts 37 and 38, and the solenoid is energized and returns the controller to the neutral position.

Since the vehicle may be left standing, with the brake applied, for long periods of time, it may be desirable to provide means for breaking the solenoid-circuit after the solenoid has performed its function of returning the controller to neutral position, so as to prevent the waste of battery-current. Accordingly, I have shown, diagrammatically, in the drawings a circuit-breaker for this purpose, this circuit-breaker comprising an arm 40 and a fixed contact 41 interposed in the wire 36. A spring 42 normally holds the contact-arm 40 in closed-circuit position, but a lug 43 on the rack 27 is so located that when the rack has reached its lowermost position the lug engages an insulated arm extending from the contact-arm and moves the latter to open-circuit position, as shown in Fig. 2, thus breaking the solenoid-circuit.

While I have described electromagnetic means for the purpose of returning the controller to neutral position, it will be apparent that the invention is not necessarily limited to the use of means of that character for the purpose in question.

In order to prevent the controller from being moved from neutral position to forward-driving position so long as the brake is applied, I employ a detent 46, which is pivoted on the casing of the controller and is normally pressed, by a spring 47, into position to coöperate with a beveled lug 45 on the detent-plate 12. The detent 46 is provided with an arm 48 which coöperates with the bent upper extremity 49 of the rod 21. So long as the brake is not in operation the detent is held out of operative position by means of the parts 48 and 49, but whenever the brake is applied the detent 46 is released, and when the controller thereupon returns to neutral position the detent rides over the lug 45, and then snaps into position behind it, as shown in Fig. 2, and thereafter it is impossible to move the controller into forward-driving position until the brake is released. The detent is not arranged to prevent movement of the controller to backward-driving position, since it may be desirable, at times, to move the controller to such position while the brake is applied, in order that the motor may be used to supplement the action of the brake in arresting the movements of the vehicle.

I claim:—

1. The combination, with the brake-mechanism of an electric vehicle, and the speed-controlling means manually operable independently of the brake-mechanism, of means, connected with and controlled by the brake-mechanism, for moving the speed-controlling means automatically to neutral position when the brake is applied.

2. The combination, with the circuit-controller and the brake-mechanism of an electric vehicle, of means, connected with and controlled by said brake-mechanism, for moving the controller automatically to neutral position when the brake is applied, and for locking the controller, so long as the brake is in operation, against movement, in at least one direction, from said position.

3. The combination, with the circuit-controller and the brake-mechanism of an electric vehicle, of means for retaining the controller in operative position; connections, between the brake-mechanism and the retaining-means, for throwing the latter out of operation when the brake is applied; and means for returning the controller automatically to neutral position when released from the action of the retaining-means.

4. The combination, with the circuit-controller and the brake-mechanism of an electric vehicle, of an electromagnetic device connected with the controller and adapted, when energized, to return the controller to neutral position; a source of electricity; and means, actuated by the brake-mechanism, for connecting the electromagnetic device in circuit with the source of electricity when the brake is applied.

5. The combination, with the controller and the brake-mechanism of an electric vehicle, of means for retaining the controller in operative position; connections, between the brake-mechanism and the retaining-means, for throwing the latter out of operation when the brake is applied; and means, connected with and controlled by the brake-mechanism, for returning the controller automatically to neutral position when the brake is applied.

In testimony whereof, I affix my signature in presence of two witnesses.

SAMUEL S. AMDURSKY.

Witnesses:
W. P. GRAHAM,
RICH P. WHITNEY.